United States Patent
Takahashi et al.

(10) Patent No.: US 8,585,542 B2
(45) Date of Patent: Nov. 19, 2013

(54) CONTROL OF AND CONTROL METHOD FOR VEHICLE CONTINUOUSLY VARIABLE TRANSMISSION

(75) Inventors: Seiichiro Takahashi, Isehara (JP); Hiroyasu Tanaka, Atsugi (JP); Ryousuke Nonomura, Kawasaki (JP); Jouji Seki, Zama (JP); Takuichiro Inoue, Fujisawa (JP); Mamiko Inoue, Ebina (JP)

(73) Assignees: Nissan Motor Co., Ltd., Yokohama-shi (JP); JATCO Ltd, Fuji-shi (JP)

( * ) Notice: Subject to any disclaimer, the term of this patent is extended or adjusted under 35 U.S.C. 154(b) by 686 days.

(21) Appl. No.: 12/837,133

(22) Filed: Jul. 15, 2010

(65) Prior Publication Data

US 2011/0015839 A1    Jan. 20, 2011

(30) Foreign Application Priority Data

Jul. 17, 2009    (JP) .................. 2009-169181

(51) Int. Cl.
  *B60W 10/04*    (2006.01)
  *F16H 61/662*    (2006.01)
  *F16H 61/00*    (2006.01)

(52) U.S. Cl.
  USPC .............................. 477/41; 477/44; 477/118

(58) Field of Classification Search
  USPC .............. 475/209, 210; 477/41, 44, 115, 118
  See application file for complete search history.

(56) References Cited

U.S. PATENT DOCUMENTS

| | | |
|---|---|---|
| 4,672,863 A | 6/1987 | Itoh et al. |
| 4,674,359 A | 6/1987 | Hattori |
| 4,793,217 A | 12/1988 | Morisawa et al. |
| 5,207,122 A | 5/1993 | Minagawa |
| 5,282,401 A | 2/1994 | Hebbale et al. |
| 5,427,579 A | 6/1995 | Kanehara et al. |
| 5,456,647 A | 10/1995 | Holbrook |
| 5,468,198 A | 11/1995 | Holbrook et al. |
| 5,707,313 A | 1/1998 | Suzuki |
| 5,711,741 A | 1/1998 | Inoue |

(Continued)

FOREIGN PATENT DOCUMENTS

| | | |
|---|---|---|
| DE | 34 24 646 A1 | 2/1985 |
| DE | 100 51 692 A1 | 5/2001 |

(Continued)

OTHER PUBLICATIONS

R. Nonomura et al., US PTO Notice of Allowance, U.S. Appl. No. 12/828,604, dated Jun. 7, 2012, (12 pgs.).

(Continued)

*Primary Examiner* — Roger Pang
(74) *Attorney, Agent, or Firm* — Foley & Lardner LLP

(57) ABSTRACT

A control device for a vehicle continuously variable transmission comprises a shift control means for controlling either of or both the speed ratio at the continuously variable transmission mechanism and the gear position at the subtransmission mechanism so as to adjust an overall speed ratio to a final speed ratio and a torque capacity control means for controlling the torque capacity at a disengagement-side frictional engagement element in the subtransmission mechanism so as to sustain a torque capacity value substantially equal to zero in an inertia phase occurring during a process of adjusting the gear position at the subtransmission mechanism from the first gear position to the second gear position when a negative torque is input to the vehicle continuously variable transmission.

9 Claims, 12 Drawing Sheets

(56) References Cited

U.S. PATENT DOCUMENTS

| | | |
|---|---|---|
| 5,827,153 A | 10/1998 | Yasue et al. |
| 5,947,856 A | 9/1999 | Tabata et al. |
| 5,984,829 A | 11/1999 | Minagawa et al. |
| 6,157,884 A | 12/2000 | Narita et al. |
| 6,295,497 B1 | 9/2001 | Kuras |
| 6,344,008 B1 | 2/2002 | Nagano et al. |
| 6,514,165 B2 | 2/2003 | Saito |
| 6,543,593 B2 | 4/2003 | Saito |
| 6,876,913 B2 | 4/2005 | Segawa et al. |
| 7,108,631 B2 | 9/2006 | Inoue et al. |
| 7,637,836 B2 | 12/2009 | Watanabe et al. |
| 7,780,570 B2 | 8/2010 | Iwatsuki et al. |
| 7,980,993 B2 * | 7/2011 | Ishii et al. ............... 477/109 |
| 8,052,572 B2 | 11/2011 | Unno |
| 8,131,436 B2 | 3/2012 | Suzuki et al. |
| 8,187,145 B2 | 5/2012 | Kaminsky et al. |
| 8,204,659 B2 | 6/2012 | Kouno et al. |
| 8,214,093 B2 | 7/2012 | Heap et al. |
| 8,216,110 B2 | 7/2012 | Katakura et al. |
| 8,226,528 B2 * | 7/2012 | Yokokawa et al. ......... 477/44 |
| 2002/0034999 A1 | 3/2002 | Saito |
| 2002/0035011 A1 | 3/2002 | Saito |
| 2005/0090365 A1 | 4/2005 | Tamai et al. |
| 2005/0164820 A1 | 7/2005 | Miyata et al. |
| 2006/0089775 A1 | 4/2006 | Whitton et al. |
| 2007/0129922 A1 | 6/2007 | Lee et al. |
| 2008/0020896 A1 | 1/2008 | Kamishima |
| 2008/0032861 A1 | 2/2008 | Maki et al. |
| 2008/0096721 A1 | 4/2008 | Honma et al. |
| 2009/0105041 A1 | 4/2009 | McKenzie et al. |
| 2009/0111650 A1 | 4/2009 | Joen |
| 2010/0057316 A1 | 3/2010 | Tanaka et al. |
| 2010/0228412 A1 | 9/2010 | Sah |
| 2010/0248895 A1* | 9/2010 | Jozaki et al. ............... 477/44 |
| 2011/0231048 A1 | 9/2011 | Matsubara et al. |

FOREIGN PATENT DOCUMENTS

| | | |
|---|---|---|
| DE | 10 2005 050 615 A1 | 4/2006 |
| EP | 0 199 533 A1 | 10/1986 |
| EP | 0 217 221 A2 | 4/1987 |
| EP | 0 959 270 A2 | 11/1999 |
| GB | 2 144 814 A | 3/1985 |
| JP | 60-037455 A | 2/1985 |
| JP | 61-31752 A | 2/1986 |
| JP | 61-103049 A | 5/1986 |
| JP | 61-241562 A | 10/1986 |
| JP | 62-137239 A | 6/1987 |
| JP | 62-132831 U | 8/1987 |
| JP | 63-266264 A | 11/1988 |
| JP | 63-266265 A | 11/1988 |
| JP | 4-211760 A | 8/1992 |
| JP | 5-10427 A | 1/1993 |
| JP | 05-026317 A | 2/1993 |
| JP | 5-71627 A | 3/1993 |
| JP | 05-079554 A | 3/1993 |
| JP | 6-331013 A | 11/1994 |
| JP | 06-331016 A | 11/1994 |
| JP | 8-178043 A | 7/1996 |
| JP | 9-210165 A | 8/1997 |
| JP | 10-299880 A | 11/1998 |
| JP | 11-51162 A | 2/1999 |
| JP | 11-082721 A | 3/1999 |
| JP | 11-093987 A | 4/1999 |
| JP | 11-182663 A | 7/1999 |
| JP | 11-210874 A | 8/1999 |
| JP | 2000-145939 A | 5/2000 |
| JP | 2000-266173 A | 9/2000 |
| JP | 2000-346169 A | 12/2000 |
| JP | 2002-89701 A | 3/2002 |
| JP | 2002-323122 A | 11/2002 |
| JP | 2004-125106 A | 4/2004 |
| JP | 2004-150549 A | 5/2004 |
| JP | 2004-203220 A | 7/2004 |
| JP | 2007-92665 A | 4/2007 |
| JP | 2007-118727 A | 5/2007 |
| JP | 2007-146906 A | 6/2007 |
| JP | 2008-059052 A | 3/2008 |
| WO | WO 2009/075283 A1 | 6/2009 |

OTHER PUBLICATIONS

S. Takahashi et al., US PTO Notice of Allowance on U.S. Appl. No. 12/836,021 DTD Oct. 5, 2012, (45 pgs.).
S. Takahashi et al., US PTO Office Action on U.S. Appl. No. 12/836,099 DTD Sep. 18, 2012, (23 pgs.).
S. Takahashi et al. US PTO Office Action on U.S. Appl. No. 12/836,104 DTD Sep. 24, 2012, (24 pgs.).
S. Takahashi et al., US PTO Notice of Allowance on U.S. Appl. No. 12/836,128 DTD Sep. 17, 2012, (50 pgs.).
S. Takahashi et al., US PTO Notice of Allowance on U.S. Appl. No. 12/837,129 DTD Oct. 11, 2012, (20 pgs.).
R. Nonomura et al., US PTO Notice of Allowance, U.S. Appl. No. 12/828,604, dated Feb. 13, 2012, (17 pgs.).
S. Takahashi et al., US PTO Notice of Allowance on U.S. Appl. No. 12/836,104 DTD Feb. 20, 2013, (12 pgs.).
S. Takahashi et al., US PTO Non-Final Office Action, U.S. Appl. No. 12/836,099 DTD Mar. 13, 2013, (20 pgs.).
S. Takahashi et al., US PTO Notice of Allowance on U.S. Appl. No. 12/836,172 DTD Oct. 19, 2012, 1 (20 pgs.).
U.S. Appl. No. 12/836,021, filed Jul. 14, 2010, Nonomura et al.
U.S. Appl. No. 12/836,099, filed Jul. 14, 2010, Takahashi et al.
U.S. Appl. No. 12/836,104, filed Jul. 14, 2010, Takahashi et al.
U.S. Appl. No. 12/836,128, filed Jul. 14, 2010, Takahashi et al.
U.S. Appl. No. 12/837,129, filed Jul. 15, 2010, Takahashi et al.
U.S. Appl. No. 12/836,172, filed Jul. 14, 2010, Takahashi et al.
U.S. Appl. No. 12/828,604, filed Jul. 1, 2010, Nonomura et al.
S. Takahashi et al., U.S. Notice of Allowance; U.S. Appl. No. 12/836,099, dated Jun. 26, 2013, (15 pages).

* cited by examiner

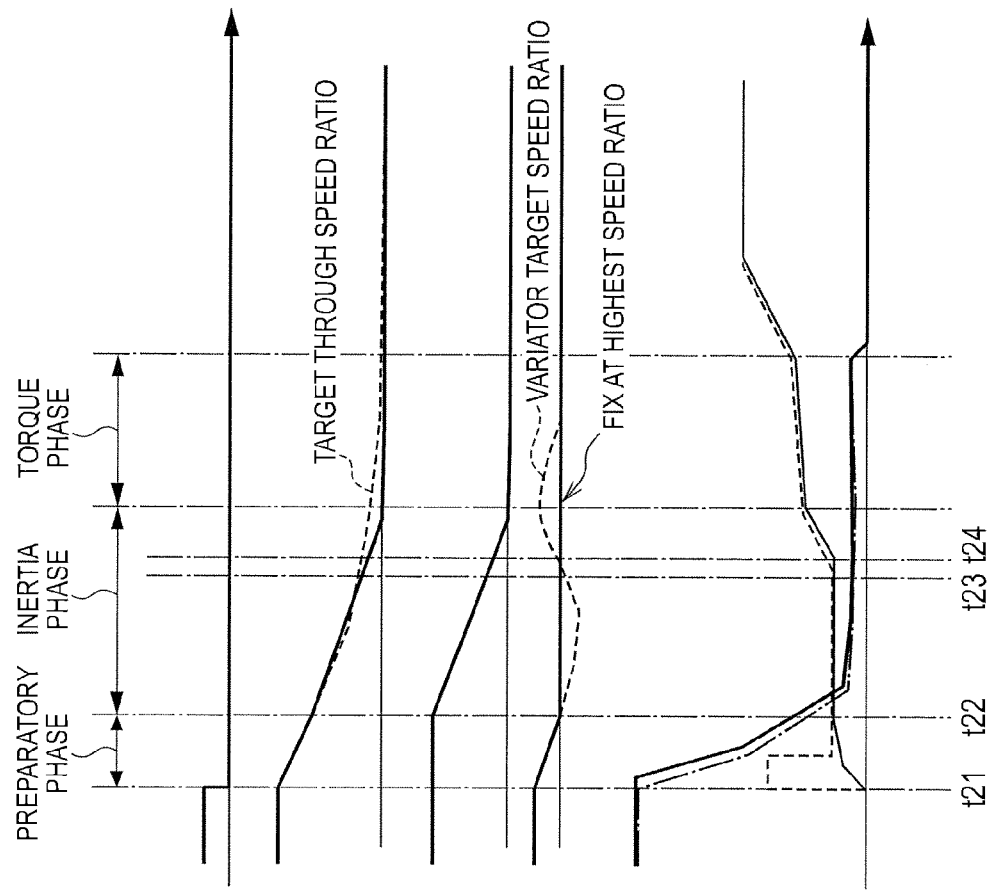

US 8,585,542 B2

CONTROL OF AND CONTROL METHOD FOR VEHICLE CONTINUOUSLY VARIABLE TRANSMISSION

This application claims priority from Japanese Patent Application 2009-169181, filed Jul. 17, 2009, which is incorporated herein by reference in its entirety.

FIELD OF THE INVENTION

This invention relates to control of a vehicle continuously variable transmission.

BACKGROUND OF THE INVENTION

The control device for a vehicle continuously variable transmission disclosed in JPH5-79554A, issued by the Japan Patent Office in the year 2002, controls a vehicle continuously variable transmission equipped with a subtransmission mechanism that can be switched to any of a plurality of gear positions as well as a continuously variable transmission mechanism, so that the continuously variable transmission mechanism shifts down as the subtransmission mechanism is shifted up to a higher gear position.

SUMMARY OF THE INVENTION

The vehicle continuously variable transmission control device in the related art described above executes slip control for a frictional engagement element present on a disengagement-side of the subtransmission mechanism when shifting the subtransmission mechanism up to a higher gear position while a negative torque is input to the vehicle continuously variable transmission. This gives rise to an issue that heat is generated at the disengagement-side frictional engagement element.

Accordingly, an object of this invention is to inhibit heat generation at the disengagement-side frictional engagement element even as the subtransmission mechanism is shifted up to a higher gear position while a negative torque is input to the vehicle continuously variable transmission.

In order to achieve the object described above, this invention provides a control device for a vehicle continuously variable transmission comprising a continuously variable transmission that allows continuous speed ratio adjustment and a subtransmission mechanism that is disposed in series with respect to the continuously variable transmission mechanism, assumes a specific forward gear position among forward gear positions including a first gear position and a second gear position having a smaller speed ratio relative to the first gear position, and is switched to the first gear position or the second gear position as a plurality of frictional engagement elements are selectively engaged or disengaged. The control device sets, based upon a vehicle operating state, an overall speed ratio to be achieved via both the continuously variable transmission mechanism and the subtransmission mechanism as an overall speed ratio and controls either the speed ratio at the continuously variable transmission mechanism or the gear position at the subtransmission mechanism or both the speed ratio at the continuously variable transmission mechanism and the gear position at the subtransmission mechanism so that the overall speed ratio matches the overall speed ratio. The control device adjusts the torque capacity of a disengagement-side frictional engagement element at the subtransmission mechanism to substantially 0 during an inertia phase taking place while the gear position at the subtransmission mechanism shifts from the first gear position to the second gear position as a negative torque is input to the vehicle continuously variable transmission.

This invention will be described in further detail together with other characteristics and advantages thereof in the following description provided in the specification by referring to the attached drawings.

BRIEF DESCRIPTION OF THE DRAWINGS

FIGS. 12A-12E present a time chart of transmission control operations executed in the third embodiment of this invention.

DESCRIPTION OF PREFERRED EMBODIMENTS

An embodiment of this invention will be described below with reference to the attached drawings. It should be noted that in the following description, a "speed ratio" of a certain transmission mechanism is a value obtained by dividing an input rotation speed of the transmission mechanism by an output rotation speed of the transmission mechanism. Further, a "Lowest speed ratio" denotes a maximum speed ratio of the transmission mechanism, and a "Highest speed ratio" denotes a minimum speed ratio of the transmission mechanism.

Figure 1:
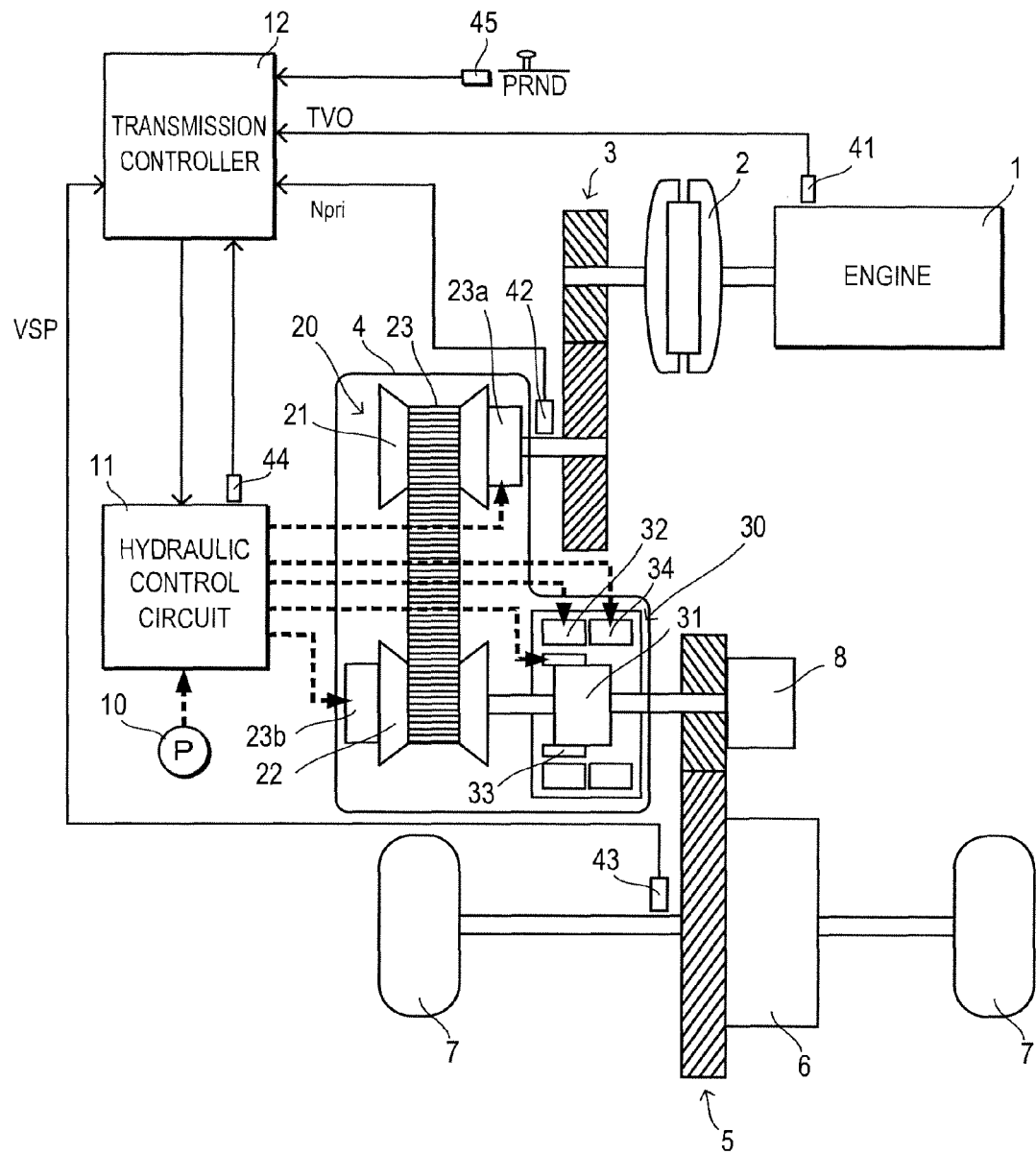
FIG. 1 is a schematic structural diagram of a vehicle with a continuously variable transmission achieved in a first embodiment of this invention installed therein.

FIG. 1 is a schematic constitutional diagram of a vehicle installed with a continuously variable transmission according to an embodiment of this invention. The vehicle has an internal combustion engine 1 as a power source. Output rotation of the engine 1 is transmitted to a drive wheel 7 via a torque converter having a lockup clutch 2, a first gear train 3, a continuously variable transmission (to be referred to as a "transmission 4" hereafter), a second gear train 5, and a final reduction gear 6. The second gear train 5 is provided with a parking mechanism 8 which locks an output shaft of the transmission 4 mechanically so that the output shaft is incapable of rotation during parking.

The vehicle is further provided with an oil pump 10 which is driven using a part of the power of the engine 1, a hydraulic control circuit 11 which regulates an oil pressure from the oil pump 10 and supplies the regulated oil pressure to various sites of the transmission 4, and a transmission controller 12 which controls the hydraulic control circuit 11.

To describe the respective constitutions, the transmission 4 includes a belt type continuously variable transmission mechanism (to be referred to as a "variator 20" hereafter), and a subtransmission mechanism 30 provided to the rear of and in series with the variator 20. The term "provided to the rear of" means that the subtransmission mechanism 30 is provided further toward the drive wheel 7 side than the variator 20 on a power transmission path extending from the engine 1 to the drive wheel 7. Further, the term "provided in series" means that the variator 20 and the subtransmission mechanism 30 are provided in series on this power transmission path. The subtransmission mechanism 30 may be directly connected to an output shaft of the variator 20, as in this example, or via another transmission mechanism or power transmission mechanism (for example, a gear train).

The variator 20 includes a primary pulley 21, a secondary pulley 22, and a V belt 23 wrapped around the pulleys 21, 22. The pulleys 21, 22 respectively include a fixed conical plate, a movable conical plate that is disposed relative to the fixed conical plate such that respective sheave surfaces thereof oppose each other and forms a V groove with the fixed conical plate, and a hydraulic cylinder 23a, 23b that is provided on a back surface of the movable conical plate and displaces the movable conical plate in an axial direction. When an oil pressure supplied to the hydraulic cylinder 23a, 23b is varied, the width of the V groove varies, leading to variation in a contact radius between the V belt 23 and the pulley 21, 22, and as a result, a speed ratio vRatio of the variator 20 varies continuously.

The subtransmission mechanism 30 is a two-forward speed, one-reverse speed transmission mechanism. The subtransmission mechanism 30 includes a Ravigneaux planetary gear mechanism 31 coupling the carriers of two planetary gear sets, and a plurality of frictional engagement elements (a Low brake 32, a High clutch 33, and a Rev brake 34) connected to a plurality of rotary elements constituting the Ravigneaux planetary gear mechanism 31 to modify the rotation states thereof. The gear position of the subtransmission mechanism 30 is changed by adjusting the oil pressure supplied to the respective frictional engagement elements 32 to 34 such that the engagement/disengagement states of the respective frictional engagement elements 32 to 34 are modified. For example, by engaging the Low brake 32 and disengaging the High clutch 33 and Rev brake 34, the gear position of the subtransmission mechanism 30 is set in a first speed. By engaging the High clutch 33 and disengaging the Low brake 32 and Rev brake 34, the gear position of the subtransmission mechanism 30 is set in a second speed having a smaller speed ratio than the first speed. By engaging the Rev brake 34 and disengaging the Low brake 32 and the High clutch 33, the gear position of the subtransmission mechanism 30 is set in reverse. It should be noted that in the following description, a state in which the gear position of the subtransmission mechanism 30 is in the first speed will be expressed as "the transmission 4 is in a low speed mode", and a state in which the gear position of the subtransmission mechanism 30 is in the second speed will be expressed as "the transmission 4 is in a high speed mode".

Figure 2:
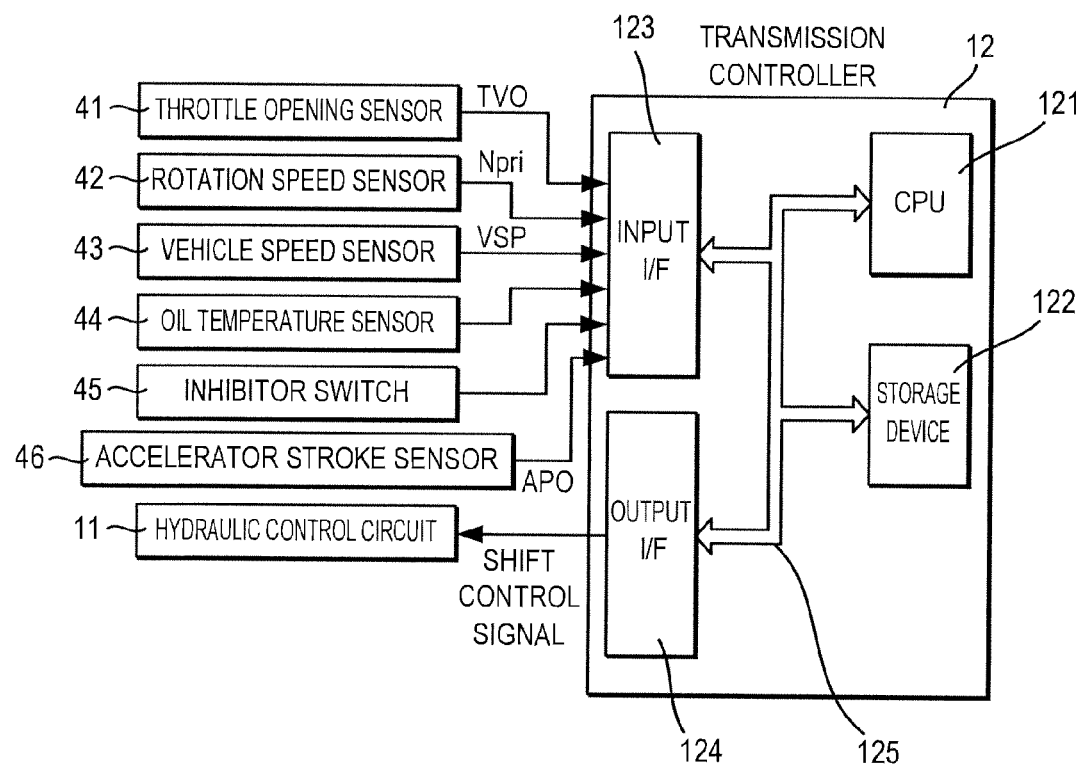
FIG. 2 shows the internal structure adopted in a transmission controller achieved in the first embodiment of this invention.

As shown in FIG. 2, the transmission controller 12 is constituted by a CPU 121, a storage device 122 including a RAM and a ROM, an input interface 123, an output interface 124, and a bus 125 connecting these components to each other.

Signals output from a throttle opening sensor 41, a rotation speed sensor 42, a vehicle speed sensor 43, an oil temperature sensor 44, an inhibitor switch 45, an accelerator stroke sensor 46 and the like are input to the input interface 123. The throttle opening sensor 41 detects the degree of opening (hereafter referred to as the "throttle opening") TVO at a throttle valve in the engine 1. The rotation speed sensor 42 detects an input rotation speed (=the rotation speed of the primary pulley 21, hereafter referred to as a "primary rotation speed") Npri at the transmission 4. The vehicle speed sensor 43 detects a traveling speed (hereafter referred to as the "vehicle speed") VSP at which the vehicle travels. The oil temperature sensor 44 detects the temperature of the oil in the transmission 4. The inhibitor switch 45 detects the position of a select lever installed in the vehicle. The accelerator stroke sensor 46 detects the extent APO to which the accelerator pedal is depressed.

The storage device 122 stores a shift control program for the transmission 4 and a shift map (FIG. 4) used by the shift control program. The CPU 121 reads and executes the shift control program stored in the storage device 122, generates a shift control signal by implementing various types of calculation processing on the various signals input via the input interface 123, and outputs the generated shift control signal to the hydraulic control circuit 11 via the output interface 124. Various values used in the calculation processing executed by the CPU 121 and calculation results thereof are stored in the storage device 122 as appropriate.

The hydraulic control circuit 11 is constituted by a plurality of flow passages and a plurality of hydraulic control valves. The hydraulic control circuit 11 controls the plurality of hydraulic control valves on the basis of the shift control signal from the transmission controller 12 to switch an oil pressure supply path, and prepares a required oil pressure from the oil pressure generated by the oil pump 10, which is then supplied to various sites of the transmission 4. As a result, the speed ratio vRatio of the variator 20 is modified and the gear position of the subtransmission mechanism 30 is changed, whereby a shift is performed in the transmission 4.

Figure 3:
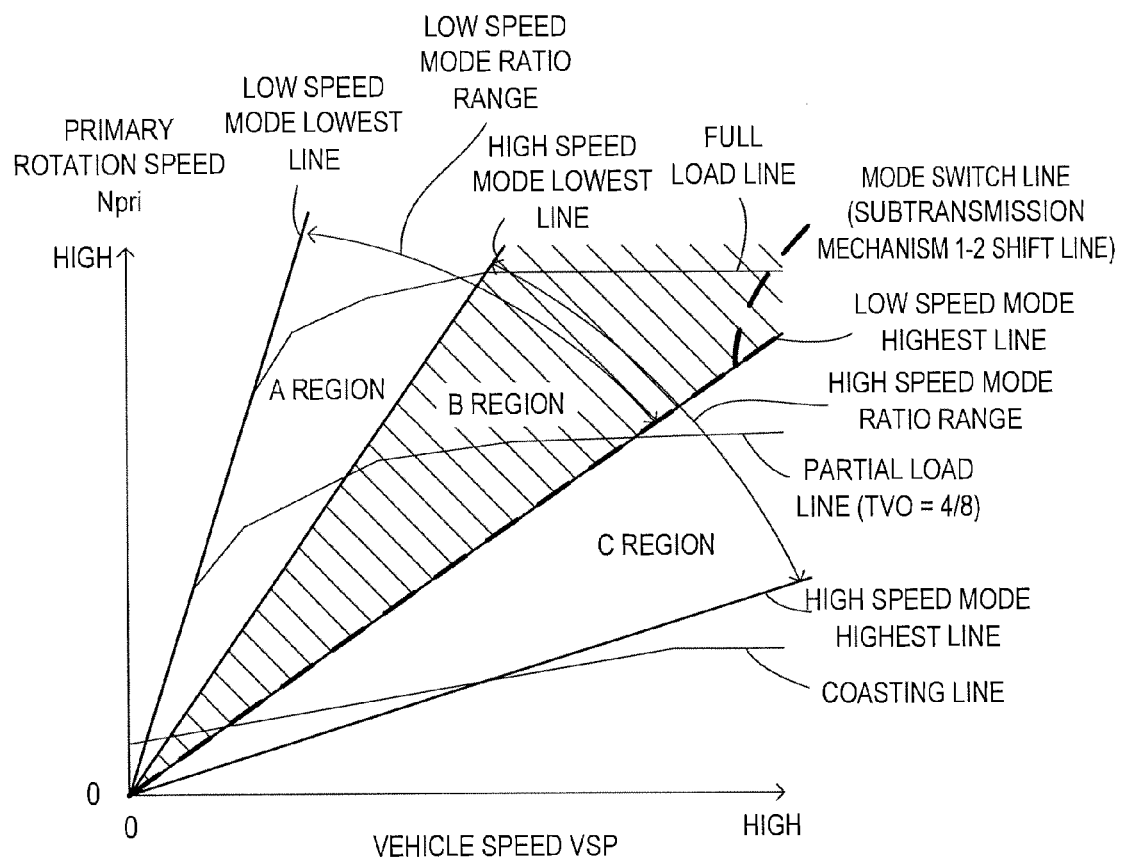
FIG. 3 presents a shift map for the transmission achieved in the first embodiment of this invention.

FIG. 3 shows an example of the shift map stored in the storage device 122 of the transmission controller 12.

On the shift map, an operating point of the transmission 4 is determined on the basis of the vehicle speed VSP and the primary rotation speed Npri. An incline of a line linking the operating point of the transmission 4 and a zero point in the lower left corner of the shift map indicates the speed ratio of the transmission 4 (an overall speed ratio obtained by multiplying the speed ratio of the subtransmission mechanism 30 with the speed ratio vRatio of the variator 20, to be referred to hereafter as a "through speed ratio Ratio").

On this shift map, similarly to a shift map of a conventional belt type continuously variable transmission, a shift line is set at each throttle opening TVO, and a shift is performed in the transmission 4 according to a shift line selected in accordance with the throttle opening TVO. For ease of understanding, FIG. 3 shows only a full load line (a shift line used when the throttle opening TVO=8/8), a partial load line (a shift line used when the throttle opening TVO=4/8), and a coasting line (a shift line used when the throttle opening TVO=0).

When the transmission 4 is in the low speed mode, the transmission 4 can be shifted between a low speed mode Lowest line, which is obtained by maximizing the speed ratio vRatio of the variator 20, and a low speed mode Highest line, which is obtained by minimizing the speed ratio vRatio of the variator 20. In the low speed mode, the operating point of the transmission 4 moves within an A region and a B region.

When the transmission 4 is in the high speed mode, the transmission 4 can be shifted between a high speed mode Lowest line, which is obtained by maximizing the speed ratio vRatio of the variator 20, and a high speed mode Highest line, which is obtained by minimizing the speed ratio vRatio of the variator 20. In the high speed mode, the operating point of the transmission 4 moves within the B region and a C region.

The speed ratios of the respective gear positions of the subtransmission mechanism 30 are set such that a speed ratio corresponding to the low speed mode Highest line (low speed mode Highest speed ratio) is smaller than a speed ratio corresponding to the high speed mode Lowest line (high speed mode Lowest speed ratio). In so doing, a low speed mode ratio range, which is the through speed ratio Ratio range of the transmission 4 in the low speed mode, and a high speed mode ratio range, which is the through speed ratio Ratio range of the transmission 4 in the high speed mode, partially overlap such that when the operating point of the transmission 4 is in the B region, which is sandwiched between the high speed mode Lowest line and the low speed mode Highest line, the transmission 4 can select either the low speed mode or the high speed mode.

In addition, on this shift map, a mode switch line (a 1-2 shift line for the subtransmission mechanism 30) indicating a shift at the subtransmission mechanism 30 is set so as to align with the low speed mode Highest line. A through speed ratio (hereafter referred to as the "mode switch speed ratio") mRatio corresponding to the mode switch line is set to a value equal to the value of the low speed mode Highest speed ratio. If the operating point of the transmission 4 crosses over the mode switch line, i.e., if the through speed ratio Ratio of the transmission 4 crosses the mode switch speed ratio mRatio, a mode switch shift is executed.

The mode switch shift is executed as the transmission controller 12 shifts the subtransmission mechanism 30 and also adjusts the speed ratio vRatio at the variator 20 along a direction opposite from the direction in which the speed ratio at the subtransmission mechanism 30 changes.

More specifically, if the through speed ratio Ratio of the transmission 40, having been greater than the mode switch speed ratio mRatio thus far, becomes smaller than the mode switch speed ratio mRatio, the transmission controller 12 adjusts the gear position at the subtransmission mechanism 30 from the first speed position to the second speed position (subtransmission mechanism 1-2 shift) and also adjusts the speed ratio vRatio at the variator 20 toward the larger speed ratio side.

If the through speed ratio Ratio of the transmission 40, having been smaller than the mode switch speed ratio mRatio thus far becomes greater than the mode switch speed ratio mRatio, the transmission controller 12 adjusts the gear position at the subtransmission mechanism 30 from the second speed position to the first speed position (subtransmission mechanism 2-1 shift) and also adjusts the speed ratio vRatio at the variator 20 toward the smaller speed ratio side.

During the mode switch shift operation, the speed ratio vRatio at the variator 20 is changed along the direction opposite from the direction in which the speed ratio at the subtransmission mechanism 30 changes so as to ensure that no step-change occurs in the through speed ratio Ratio while the mode switch shift operation is in progress. In the following description, the instance of changing the speed ratio vRatio at the variator 20 along the direction opposite from the direction in which the speed ratio at the subtransmission mechanism 30 changes during a mode switch shift operation will be referred to as a "cooperative speed change", as necessary.

The transmission 4 may execute a shift either in a power ON state or in a power OFF state.

Shifts executed in the power ON state include an upshift and a downshift achieved while the driver is stepping on the accelerator pedal, i.e., while a positive torque (a torque in conjunction with which the input side of the transmission 4 operates as the drive side) is input to the transmission 4. Shifts executed in the power OFF state include an upshift and a downshift achieved while the driver is not stepping on the accelerator pedal, i.e., while a negative torque (a torque in conjunction with which the output side of the transmission 4 operates as the drive side) is input to the transmission 4.

An object of this embodiment is to prevent heat generation at a disengagement-side frictional engagement element at the time of an upshift in the power OFF state accompanied by a mode switch shift, (hereafter to be referred to as a "power OFF upshift") among the four types of shifts listed above.

In order to achieve a power OFF upshift, the subtransmission mechanism 30 undergoes a preparatory phase, an inertia phase, a torque phase and a terminal phase to complete a change-over from the low speed mode to the high speed mode.

In the preparatory phase, preparations for changing the gear position at the subtransmission mechanism 30 are made. More specifically, the oil pressure at the disengagement-side frictional engagement element at the subtransmission mechanism 30 is lowered to a disengagement initial pressure and the specified oil pressure at the engagement-side frictional engagement element is lowered to an engagement initial pressure level after holding it at a pre-charge pressure over a predetermined length of time. The term "disengagement initial pressure" is used to refer to an oil pressure level at which the torque capacity (hereafter referred to as a "disengagement-side torque capacity") of the disengagement-side frictional engagement element (the Low break 32 in the case of a 1-2 shift) is adjusted to a capacity that allows the disengagement-side frictional engagement element to start slipping. The term "engagement initial pressure" is used to refer to an oil pressure level at which the torque capacity (hereafter referred to as a "engagement-side torque capacity") at the engagement-side frictional element (the High clutch 32 in the case of a 1-2 shift) is adjusted to a capacity that sets the engagement-side frictional element in a torque transmission-enabled state.

During the inertia phase, the oil pressures at the frictional engagement elements are controlled so as to change the input shaft rotation speed at the subtransmission mechanism 30, currently at a pre-shift rotation speed, to a post-shift rotation speed.

During the torque phase, the member that receives and holds the input torque at the subtransmission mechanism 30, is shifted from the disengagement-side frictional engagement element to the engagement-side frictional engagement element. In more specific terms, as the oil pressure at the disengagement-side frictional engagement element is lowered toward zero, the oil pressure at the engagement-side frictional engagement element is increased from the engagement initial pressure.

In the terminal phase, the engagement-side frictional engagement element is fully engaged by raising the oil pressure at the engagement-side frictional engagement element to a maximum oil pressure level.

In the embodiment, a final through speed ratio DRatio, i.e., the through speed ratio to be achieved in correspondence to the current vehicle speed VSP and accelerator pedal operation quantity APO is calculated based upon the current vehicle speed VSP and the current accelerator pedal operation quantity APO, and the through speed ratio Ratio is adjusted toward the final through speed ratio DRatio with a predetermined transient response (e.g., primary response). Namely, a target through speed ratio Ratio0 based upon which the through speed ratio Ratio can be adjusted toward the final through speed ratio DRatio with the predetermined transient response is set and control is executed so as to match the through speed ratio Ratio with the target through speed ratio Ratio0. Then, a target speed ratio vRatio0 for the variator 20 is calculated by dividing the target through speed ratio Ratio0 by the speed ratio at the subtransmission mechanism 30 and the variator 20 is controlled so as to adjust the actual speed ratio vRatio at the variator 20 to the target speed ratio vRatio0.

During the inertia phase of the power OFF upshift, the speed ratio of the subtransmission mechanism 30 changes toward the smaller speed ratio side. At this time, if the engine rotation speed is allowed to decrease naturally by regulating the disengagement-side torque capacity at zero, the change in the speed ratio at the variator 20 may not keep up with the change in the speed ratio at the subtransmission mechanism 30 even as the speed ratio at the variator 20 is increased at a maximum shift speed in order to keep pace with the change in the speed ratio at the subtransmission mechanism 30. In other words, a cooperative speed change, whereby a change in the speed ratio at the variator 20 is completed substantially simultaneously with a change in the speed ratio at the subtransmission mechanism 30, so as to ensure that no step-change in the through speed ratio occurs by altering the speed ratio at the variator 20 at the subtransmission mechanism 30, may not be successfully executed.

Accordingly, in order to ensure that a cooperative speed change is successfully achieved in conjunction with a power OFF upshift, the disengagement-side torque capacity must be controlled by executing slip control for the disengagement-side frictional engagement element during the inertial phase. However, such slip control is bound to lead to heat generation at the disengagement-side frictional engagement element.

Heat generation at the disengagement-side frictional engagement element can be most reliably prevented if slip control is not executed at all during the inertia phase. However, without slip control, a cooperative speed change may not be successfully achieved, as explained earlier. If the cooperative speed change fails, an undershoot, whereby the through speed ratio Ratio becomes lower than the target through speed ratio Ratio0, may occur while the power OFF upshift is in progress. Such an undershoot tends to occur readily particularly as a power OFF upshift is attempted at low vehicle speed. This point will be explained below in reference to FIG. 4.

Figure 4:
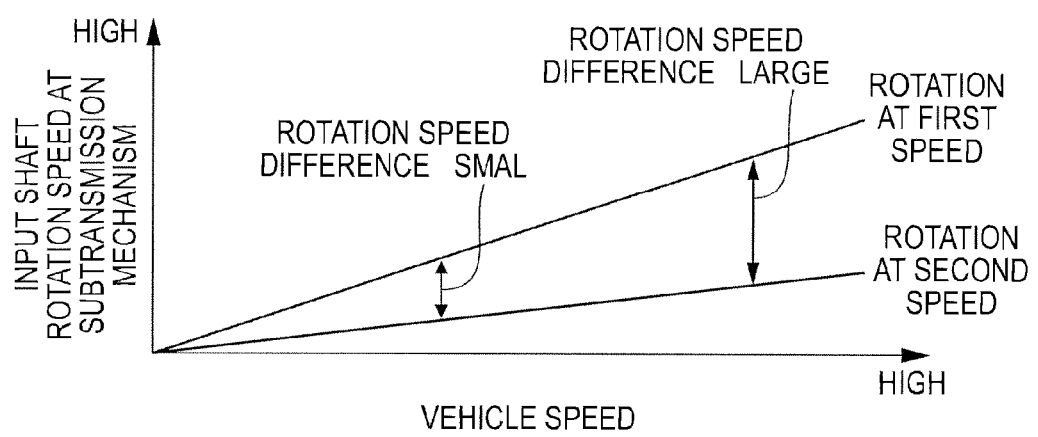
FIG. 4 indicates the relationships of the input shaft rotation speeds assumed at a first speed and a second speed each selected as the gear position at the subtransmission mechanism to the vehicle speed.

FIG. 4 shows the relationships of the input shaft rotation speeds corresponding to the first speed and the second speed each set as the gear position at the subtransmission mechanism 30 to the vehicle speed VSP.

The value obtained by multiplying the output shaft rotation speed by the speed ratio at a specific gear position indicates an input shaft rotation speed at the subtransmission mechanism 30. This means that the rotation speed difference between the input shaft rotation speed at the first speed set as the gear position at the subtransmission mechanism 30 and the input shaft rotation speed at the second speed set as the gear position at the subtransmission mechanism 30 becomes smaller when the vehicle speed is lower.

Thus, since the rotation speed difference is smaller at a lower vehicle speed, the input shaft rotation speed at the subtransmission mechanism 30 is allowed to shift from the first speed to the second speed more quickly, which causes the speed ratio at the subtransmission mechanism 30 to decrease faster, if the slip control is not executed. Then, as the rate at which the speed ratio at the subtransmission mechanism 30 decreases becomes higher than the rate at which the speed ratio at the variator 20 increases, i.e., as the absolute value of the slope of the change in the speed ratio at the subtransmission mechanism 30 becomes greater than the absolute value of the slope of the change in the speed ratio at the variator 20, an undershoot is bound to occur. In other words, an undershoot tends to occur more readily and to a greater extent when a power OFF upshift is attempted at a lower vehicle speed. The occurrence of such an undershoot will increase the extent of deviation of the through speed ratio Ratio relative to the target through speed ratio Ratio0 to result in poorer shift performance. Furthermore, since the engine rotation speed decreases as the through speed ratio Ratio decreases, the engine may stall if the through speed ratio Ratio becomes significantly lower than the final through speed ratio DRatio. Even if the engine does not become stalled, a lower engine rotation rate may interrupt fuel saving cut control to compromise fuel efficiency.

The quantity of heat that is generated is normally determined based upon the product of the clutch transmission torque and clutch differential rotation, and a greater quantity of heat is generated at the disengagement-side frictional engagement element under slip control at a higher vehicle speed due to a greater rotation speed difference.

In other words, while an undershoot tends to occur readily, only a smaller quantity of heat is generated at the disengagement-side frictional engagement element under the slip control at lower vehicle speed. In contrast, while a greater quantity of heat is generated at the disengagement-side frictional engagement element under the slip control, an undershoot does not occur readily at higher vehicle speed.

Accordingly, a cooperative speed change is executed only when the vehicle speed VSP is less than a predetermined vehicle speed so as to keep down the quantity of heat generated at the disengagement-side frictional engagement element while assuring satisfactory shift performance in the embodiment.

Figure 5:
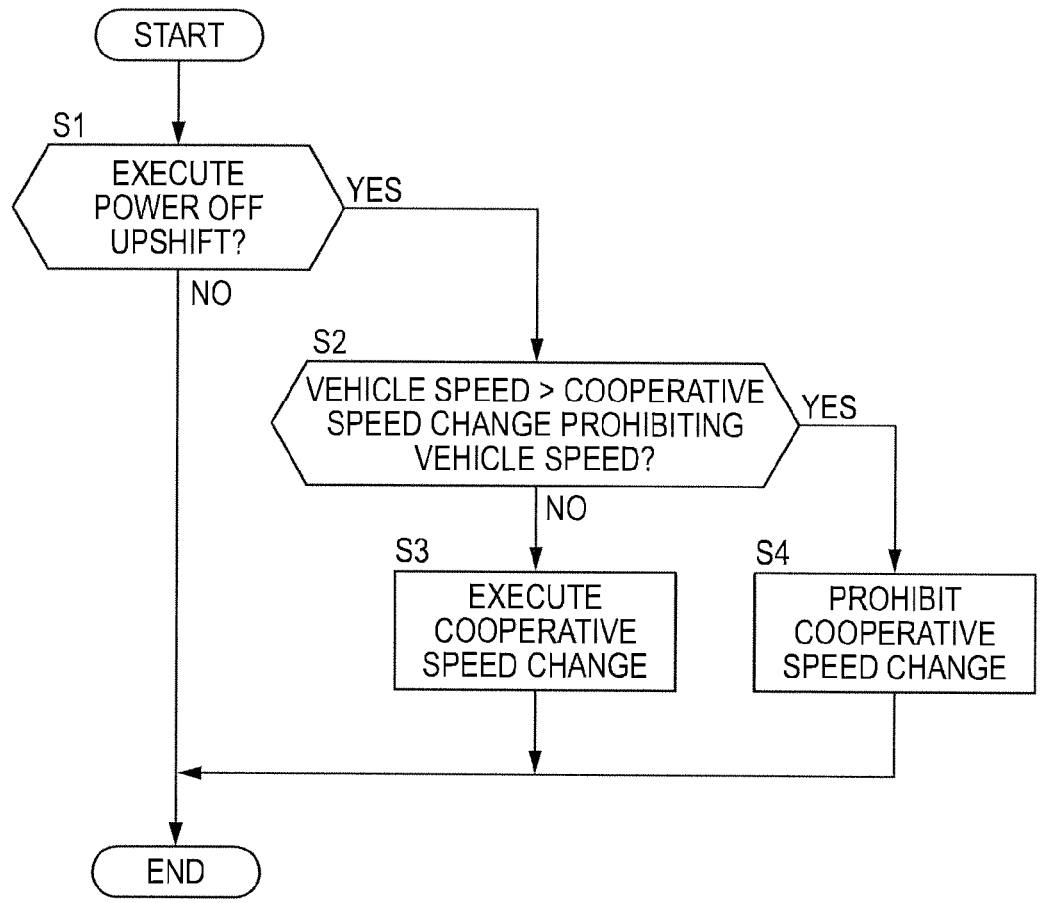
FIG. 5 is a flowchart of the processing executed based upon a transmission control program in the first embodiment of this invention.

FIG. 5 is an example of a shift control program that may be stored in the storage device 122 of the transmission controller 12 in the embodiment. The transmission controller 12 repeatedly executes this routine over a predetermined arithmetic operation cycle. The predetermined arithmetic operation cycle is set to 10 ms in the embodiment. In reference to FIG. 5, the shift control executed by the transmission controller 12 is described in specific detail.

In a step S1, the transmission controller 12 determines whether or not to execute a power OFF upshift. More specifically, it determines whether or not to execute a shift across the mode switch line by verifying whether or not the accelerator pedal operation quantity APO is substantially at zero and comparing the final through speed ratio DRatio calculated based upon the operating state with the through speed ratio Ratio. If mode switch shift control for a power OFF upshift is to be executed, the transmission controller 12 proceeds to execute the processing in a step S2. If no power OFF upshift is to be executed, it ends the current processing session.

In the step S2, the transmission controller 12 determines whether or not the vehicle speed VSP is higher than a predetermined cooperative speed change-prohibiting vehicle speed. The cooperative speed change-prohibiting vehicle speed will be described in detail in reference to FIG. 6. If the vehicle speed VSP is higher than the predetermined cooperative speed change-prohibiting vehicle speed, the transmission controller 12 proceeds to execute the processing in a step S4, but it executes the processing in a step S3 otherwise.

In the step S3, the transmission controller 12 executes a cooperative speed change. In more specific terms, it executes slip control for the disengagement-side frictional engagement element during the inertia phase so as to control the rate at which the speed ratio at the subtransmission mechanism 30 changes. As a result, it becomes possible to alter the speed ratio at the variator 20 by keeping pace with the change in the speed ratio at the subtransmission mechanism 30, and it is ensured that the change in the speed ratio at the variator 20 ends substantially simultaneously as the change in the speed ratio at the subtransmission mechanism 30 is completed, without creating any stage difference in the through speed ratio.

In the step S4, the transmission controller 12 prohibits a cooperative speed change. More specifically, the disengagement-side torque capacity is set to zero without executing any slip control for the disengagement-side frictional engagement element during the inertia phase so as to alter the speed ratio at the subtransmission mechanism 30 by allowing the engine rotation speed to drop naturally. In this case, the variator 20 is controlled so that the actual speed ratio vRatio at the variator 20 matches the target speed ratio vRatio0.

Figure 6:
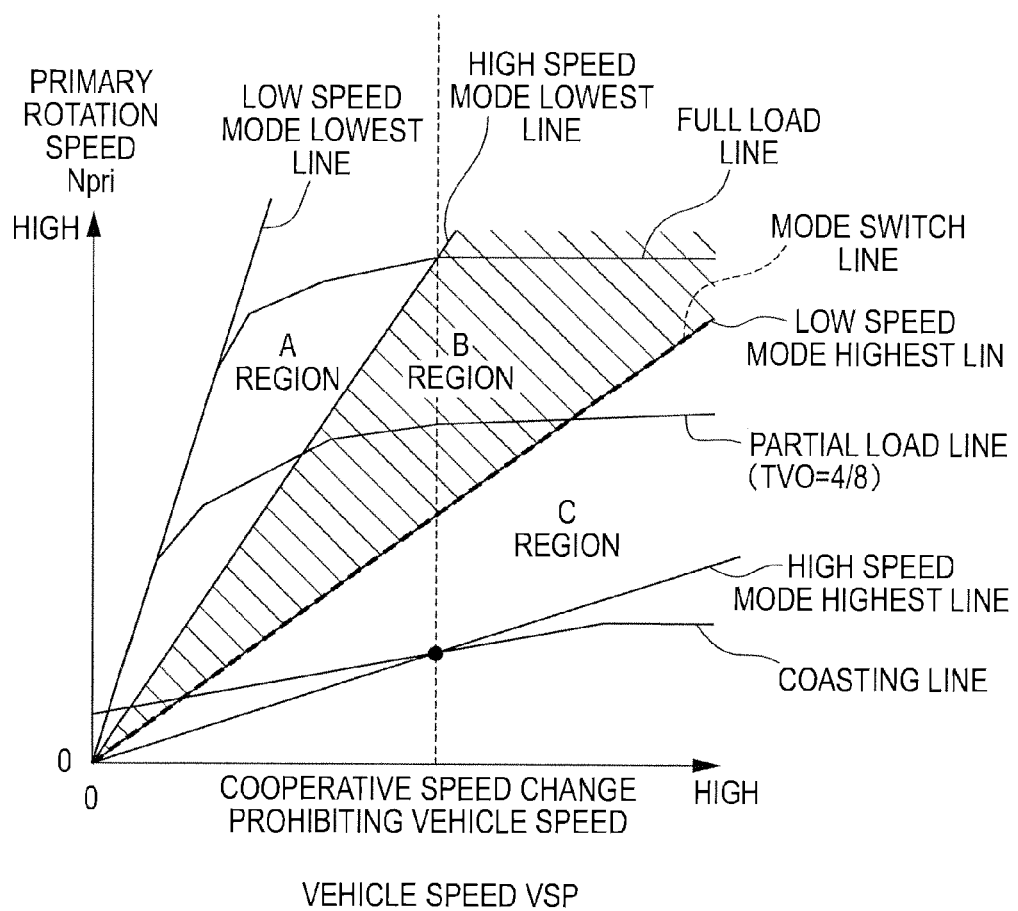
FIG. 6 illustrates how a cooperative speed change prohibiting vehicle speed may be set.
Figure 7:
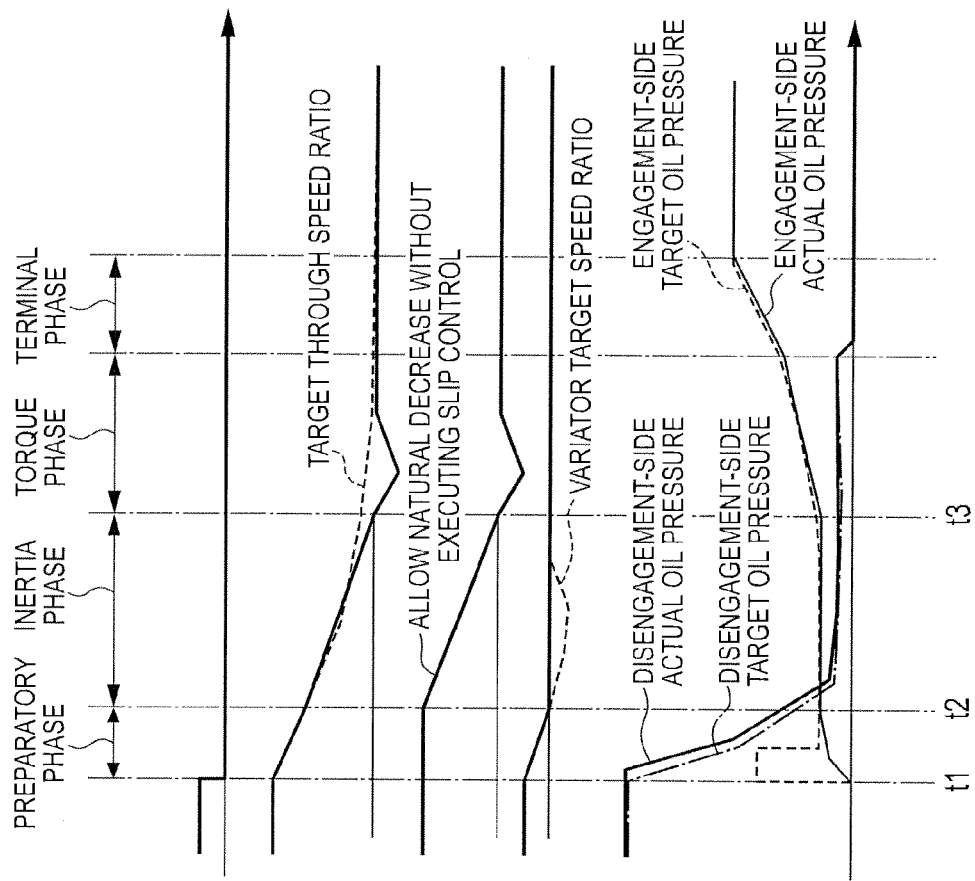
FIGS. 7A-7E present a time chart of a transmission control operation executed in the first embodiment of this invention.

FIG. 6 illustrates how the cooperative speed change prohibiting vehicle speed may be set.

The vehicle speed assumed at the point at which the coasting line and the high speed mode Highest line intersect each other on the shift map is designated as the cooperative speed change-prohibiting vehicle speed, as indicated in FIG. 6, for the following reasons in the embodiment.

Over the vehicle speed range above the cooperative speed change prohibiting vehicle speed, the high speed mode Highest line runs above the coasting line. For this reason, when a power OFF upshift is attempted over this range, the through speed ratio Ratio will never drop below the final through speed ratio DRatio even if the rate at which the speed ratio at the subtransmission mechanism 30 decreases becomes greater than the rate at which the speed ratio at the variator 20 increases. Thus, over the range above the cooperative speed change prohibiting vehicle speed, cooperative speed change can be skipped without giving rise to a risk of the engine stalling due to an undershoot.

In addition, the range above the cooperative speed change prohibiting vehicle speed is a relatively high vehicle speed range. This means that even if no cooperative speed change is executed, it will take a relatively long time for the speed ratio at the subtransmission mechanism 30 to shift from the first speed to the second speed. Namely, since the rate at which the speed ratio at the subtransmission mechanism 30 decreases does not become markedly higher than the rate at which the speed ratio at the variator 20 increases, the shift performance will not be significantly compromised.

It is to be noted that in the following description, a power OFF upshift executed over the range above the cooperative speed change prohibiting vehicle speed will be referred to as a "high vehicle speed power OFF upshift".

FIGS. 7A-7E present a time chart of a shift control operation executed in the embodiment.

As the driver's foot is lifted off the accelerator pedal in the vehicle driving at a speed equal to or greater than the cooperative speed change prohibiting vehicle speed at a time point t0, a high vehicle speed power OFF upshift is started. In response, the speed ratio vRatio at the variator 20 is lowered to the target speed ratio vRatio0 (to the Highest speed ratio in this case) and the operation enters the preparatory phase for adjusting the gear position at the subtransmission mechanism 30 from the first speed to the second speed.

Once two specific conditions, i.e., a pre-charge completion period has elapsed and the input shaft rotation speed at the subtransmission mechanism 30 has started to decrease are satisfied at a time point t2, the operation enters the inertia phase. In this situation, the current vehicle speed is equal to or higher than the cooperative speed change prohibiting vehicle speed and accordingly, the input shaft rotation speed at the subtransmission mechanism 30 is adjusted from the rotation speed corresponding to the first speed to the rotation speed corresponding to the second speed by allowing the engine rotation speed to drop naturally without executing any slip control. The variator 20, with the speed ratio thereat having already been lowered to the Highest speed ratio, sustains the lowered speed ratio.

As the input shaft rotation speed at the subtransmission mechanism 30 shifts from the rotation speed corresponding to the first speed to the rotation speed corresponding to the second speed at a time point t3, the operation enters the torque phase.

As described above, the high vehicle speed power OFF upshift is executed in the embodiment by shifting the input shaft rotation speed at the subtransmission mechanism 30 from the rotation speed corresponding to the first speed to the rotation speed corresponding to the second speed with the engine rotation speed allowed to drop naturally without executing slip control. As a result, a power OFF upshift can be executed over the vehicle speed range above the cooperative speed change prohibiting vehicle speed without causing any significant heat generation at the disengagement-side frictional engagement element.

In addition, even though no slip control is executed, it takes longer for the input shaft rotation speed at the subtransmission mechanism 30 to shift from the rotation speed corresponding to the first speed to the rotation speed corresponding to the second speed compared to the length of time required for the speed shift in a power OFF upshift executed over the range below the cooperative speed change prohibiting vehicle speed. This means that the speed ratio at the subtransmission mechanism 30 decreases more slowly and an undershoot does not occur readily. Even if an undershoot should occur, the extent of the undershoot will be kept down to a minimum. Consequently, satisfactory shift performance can be assured without having to execute a cooperative speed change.

If, on the other hand, the power OFF upshift being executed is not a high vehicle speed power OFF upshift, the input shaft rotation speed at the subtransmission mechanism 30 is switched from the rotation speed corresponding to the first speed to the rotation speed corresponding to the second speed through a cooperative speed change. As a result, satisfactory shift performance can be assured for the power OFF upshift executed over the vehicle speed range below the cooperative speed change prohibiting vehicle speed.

In summary, the quantity of heat generated at the disengagement-side frictional engagement element of the subtransmission mechanism 30 can be kept down while assuring a high level of shift performance through the embodiment described above.

The second embodiment of this invention is described next. The second embodiment of this invention is distinguishable from the first embodiment in that the oil pressure at the engagement-side frictional engagement element is increased from the engagement initial pressure during the second half of the inertia phase of a high vehicle speed power OFF upshift. The following description focuses on this feature distinguishing the second embodiment. It is to be noted that the following embodiments will be described by assigning the same reference numerals to components fulfilling functions similar to those in the previous embodiments so as to preclude the necessity for a repeated explanation thereof.

During the inertia phase of the high vehicle speed power OFF upshift, the torque capacities at the disengagement-side frictional engagement element and at the engagement-side frictional engagement element are both zero and the subtransmission mechanism 30 is in a neutral state. For this reason, if the torque capacity at the engagement-side frictional engagement element is still at zero as the input shaft rotation speed at the subtransmission mechanism 30 shifts to the rotation speed corresponding to the second speed, i.e., the post-shift gear position, the input shaft rotation speed at the subtransmission mechanism 30 will become lower than the rotation speed corresponding to the second speed, to result in compromised shift performance.

Accordingly, the oil pressure at the engagement-side frictional engagement element is increased from the engagement initial pressure level over the second half of the inertia phase so as to ensure that the input shaft rotation speed at the subtransmission mechanism 30 will not become lower than the rotation speed corresponding to the second speed during the initial period of the torque phase in the embodiment.

Figure 8:
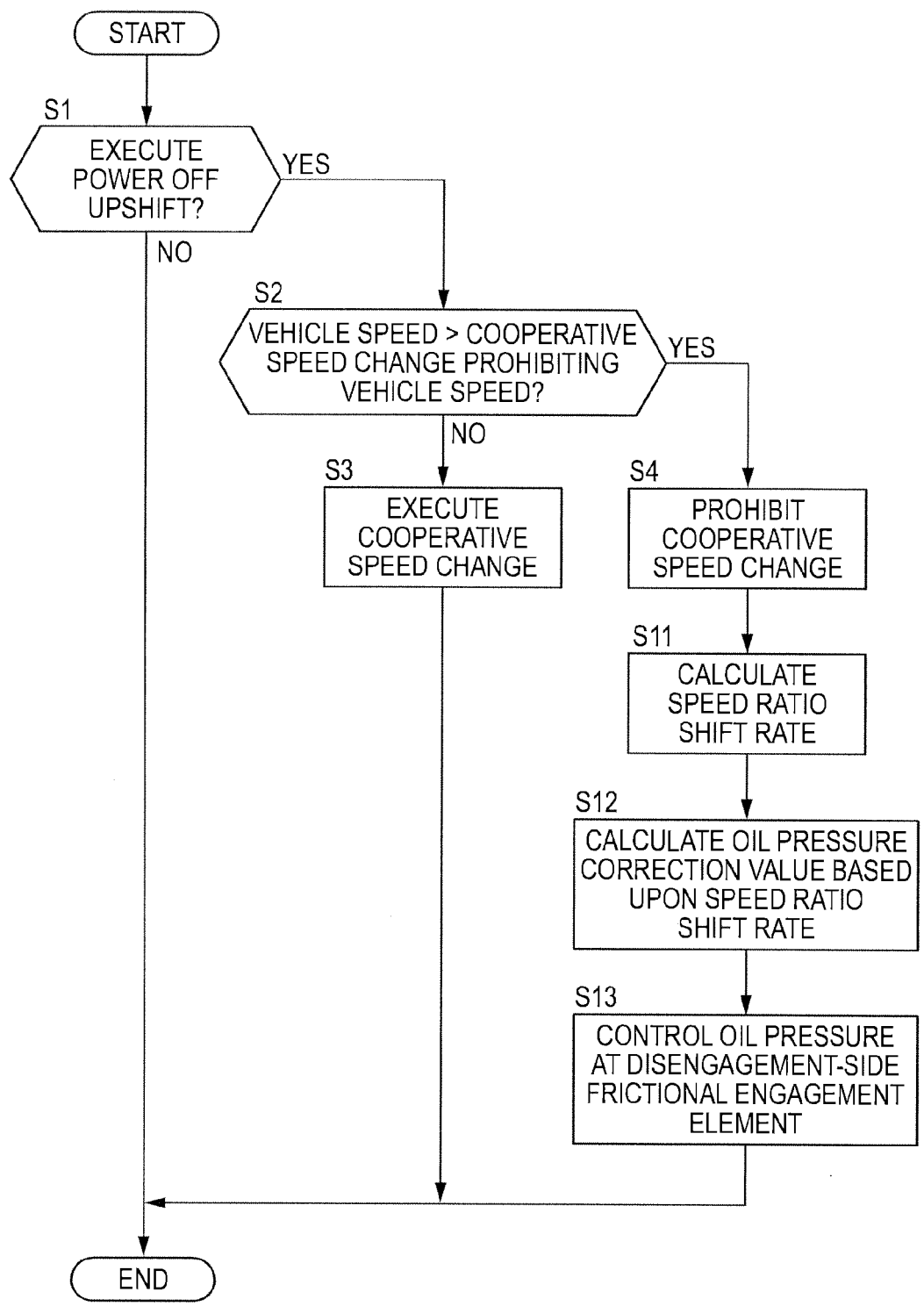
FIG. 8 is a flowchart of the processing executed based upon a transmission control program in a second embodiment of this invention.

FIG. 8 is an example of a shift control program that may be stored in the storage device 122 of the transmission controller 12 in the embodiment. The transmission controller 12 repeatedly executes this routine over a predetermined arithmetic operation cycle. The predetermined arithmetic operation cycle is set to 10 ms in the embodiment. In reference to FIG. 8, the shift control executed by the transmission controller 12 is described in specific detail.

Since the processing executed in the steps S1 through S4 is identical to that executed in the first embodiment, a repeated explanation is not provided.

In a step S11, the transmission controller 12 calculates a speed ratio shift rate for the subtransmission mechanism 30. The speed ratio shift rate thus calculated will indicate 0% when the input shaft rotation speed at the subtransmission mechanism 30 is the rotation speed corresponding to the first speed and will indicate 100% when the input shaft rotation speed is the rotation speed corresponding to the second speed. Such a speed ratio shift rate may be calculated as expressed in (1) below.

speed ratio shift rate=(first speed speed ratio−actual speed ratio)/(first speed speed ratio−second speed speed ratio)   (1)

It is to be noted that the actual speed ratio is calculated as; actual speed ratio=subtransmission mechanism input shaft rotation speed/subtransmission mechanism input shaft rotation speed.

Figure 9:
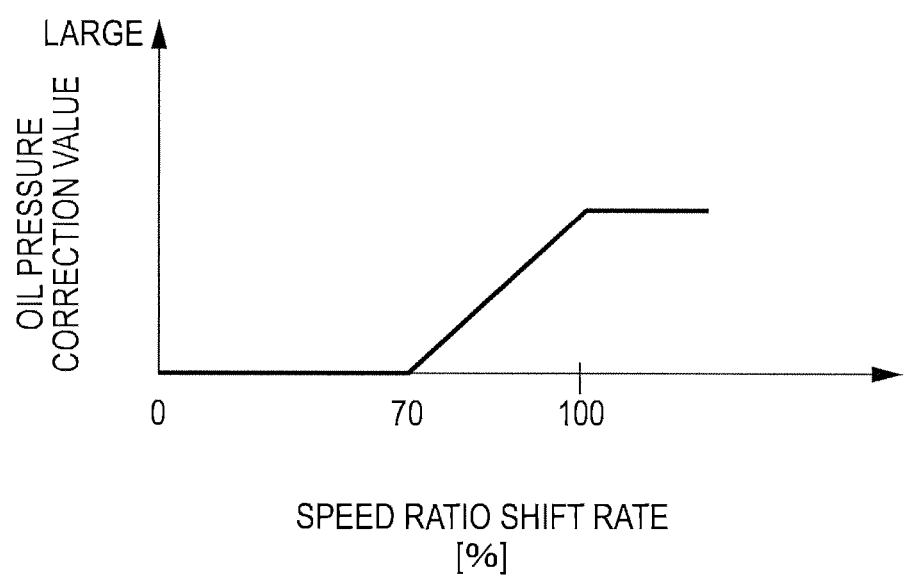
FIG. 9 indicates the relationship between the speed ratio shift rate and the engagement-side frictional engagement element oil pressure correction value.
Figure 10:
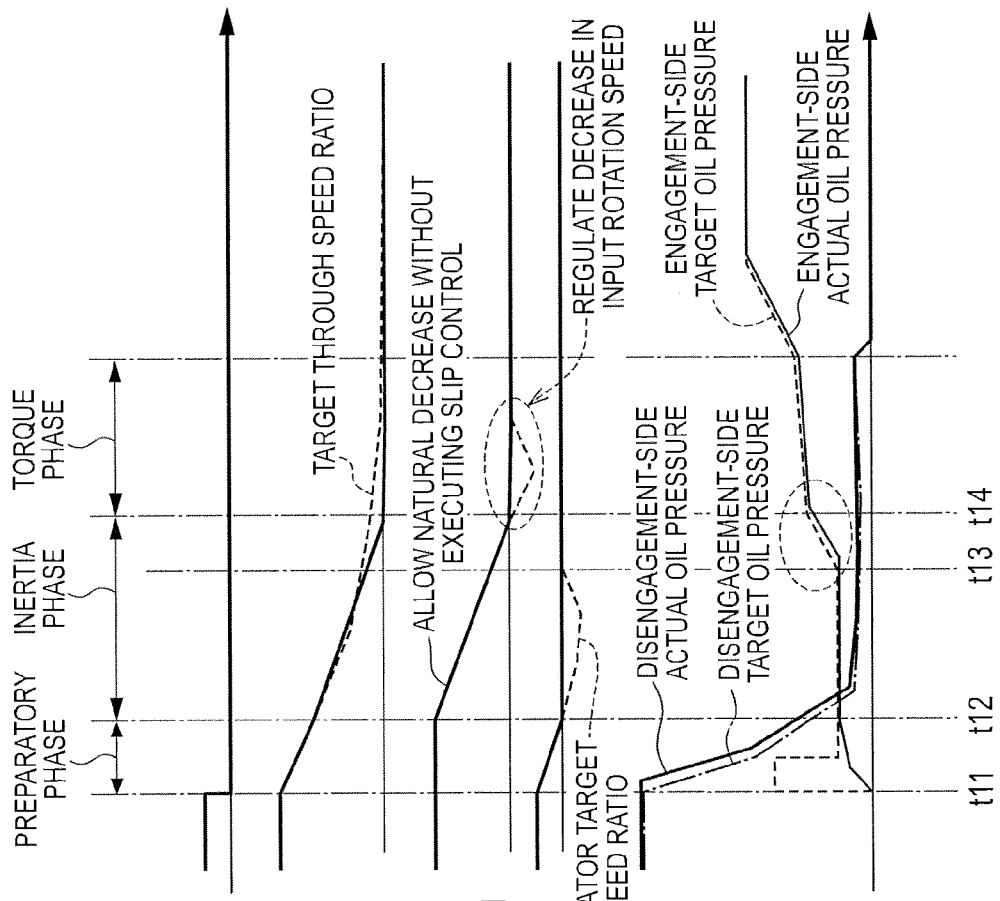
FIGS. 10A-10E present a time chart of transmission control operations executed in the second embodiment of this invention.

In a step S12, the transmission controller 12 calculates an oil pressure correction value for the engagement-side frictional engagement element based upon the speed ratio shift rate by referencing the table in FIG. 9.

In a step S13, the transmission controller 12 executes control so that the oil pressure at the engagement-side frictional engagement element will be adjusted to a value representing the sum of the engagement initial pressure and the oil pressure correction value.

FIG. 9 is a diagram indicating the relationship between the speed ratio shift rate and the oil pressure correction value calculated for the engagement-side frictional engagement element.

As indicated in FIG. 9, the oil pressure correction value remains at zero until the speed ratio shift rate exceeds a predetermined value (e.g., 70%). Once the speed ratio shift rate exceeds the predetermined value, the oil pressure correction value starts to increase in correspondence to the speed ratio shift rate increase.

FIGS. 10A-10E present a time chart of shift control operations executed in an embodiment.

After a high vehicle speed power OFF upshift starts at a time point t11, the operation enters the inertia phase at a time point t12. During the inertia phase, the input shaft rotation speed at the subtransmission mechanism 30 is shifted from the rotation speed corresponding to the first speed to the rotation speed corresponding to the second speed as the engine rotation speed is allowed to drop naturally without executing slip control.

Once the input shaft rotation speed at the subtransmission mechanism 30 falls and the speed ratio shift rate exceeds the predetermined value at a time point t13, the oil pressure at the engagement-side frictional engagement element is increased from the engagement initial pressure.

As a result, when the input shaft rotation speed at the subtransmission mechanism 30 reaches the rotation speed corresponding to the second speed at a time point t14, the engagement-side frictional engagement element is already in a torque capacity holding state. Thus, the input shaft rotation speed at the subtransmission mechanism 30 does not become lower than the rotation speed corresponding to the second speed during an initial period of the torque phase to assure a satisfactory level of shift performance.

The third embodiment of this invention is described next. The third embodiment of this invention is distinguishable from the first and second embodiments in that if the speed ratio vRatio at the variator 20 becomes equal to the Highest speed ratio during a high vehicle speed power OFF upshift, the speed ratio vRatio at the variator 20 becomes fixed at the Highest speed ratio. The following is a description of this feature differentiating the third embodiment.

During the inertia phase of the high vehicle speed power OFF upshift, the torque capacities on both the disengagement-side and the engagement-side are set to zero and the input shaft rotation speed at the subtransmission mechanism 30 is lowered to the rotation speed corresponding to the second speed with the engine rotation speed allowed to drop naturally. At the same time, a target speed ratio vRatio0 for the variator 20 is calculated by dividing the target through speed ratio Ratio0 by the speed ratio at the subtransmission mechanism 30 and the variator 20 is controlled so as to match the actual speed ratio vRatio at the variator 20 with the target speed ratio vRatio0.

Since a high vehicle speed power OFF upshift is always executed over the region where the high speed mode Highest line runs above the coasting line on the shift map, the overall target speed ratio vRatio0 of the variator 20 is adjusted to the Highest speed ratio. However, when the actual speed ratio vRatio at the variator 20 is controlled as described above, the actual speed ratio vRatio at the variator 20 having been already adjusted to the Highest speed ratio may need to be readjusted back toward the greater speed ratio side and then reset to the Highest speed ratio, depending upon how the speed ratio at the subtransmission mechanism 30 changes during the inertia phase.

If the actual speed ratio vRatio at the variator 20 shifts toward a larger speed ratio setting before the input shaft rotation speed at the subtransmission mechanism 30 is lowered to the rotation speed corresponding to the second speed, a greater braking force will be applied to the engine, which will increase the rate at which the input shaft rotation speed decreases at the subtransmission mechanism 30. Under such circumstances, a significant shock will be experienced as the input shaft rotation speed at the subtransmission mechanism 30 falls to the rotation speed corresponding to the second speed and the torque capacity on the engagement-side increases. In addition, since the actual speed ratio vRatio at the variator 20 still fails to reach the Highest speed ratio even after the input shaft rotation speed at the subtransmission mechanism 30 drops to the rotation speed corresponding to the second speed, the driver will experience a more acute sense of deceleration during the shift.

Accordingly, once the actual speed ratio vRatio at the variator 20 is adjusted to the Highest speed ratio during a high vehicle speed power OFF upshift, the actual speed ratio vRatio at the variator 20 is fixed at the Highest speed ratio in the embodiment.

Figure 11:
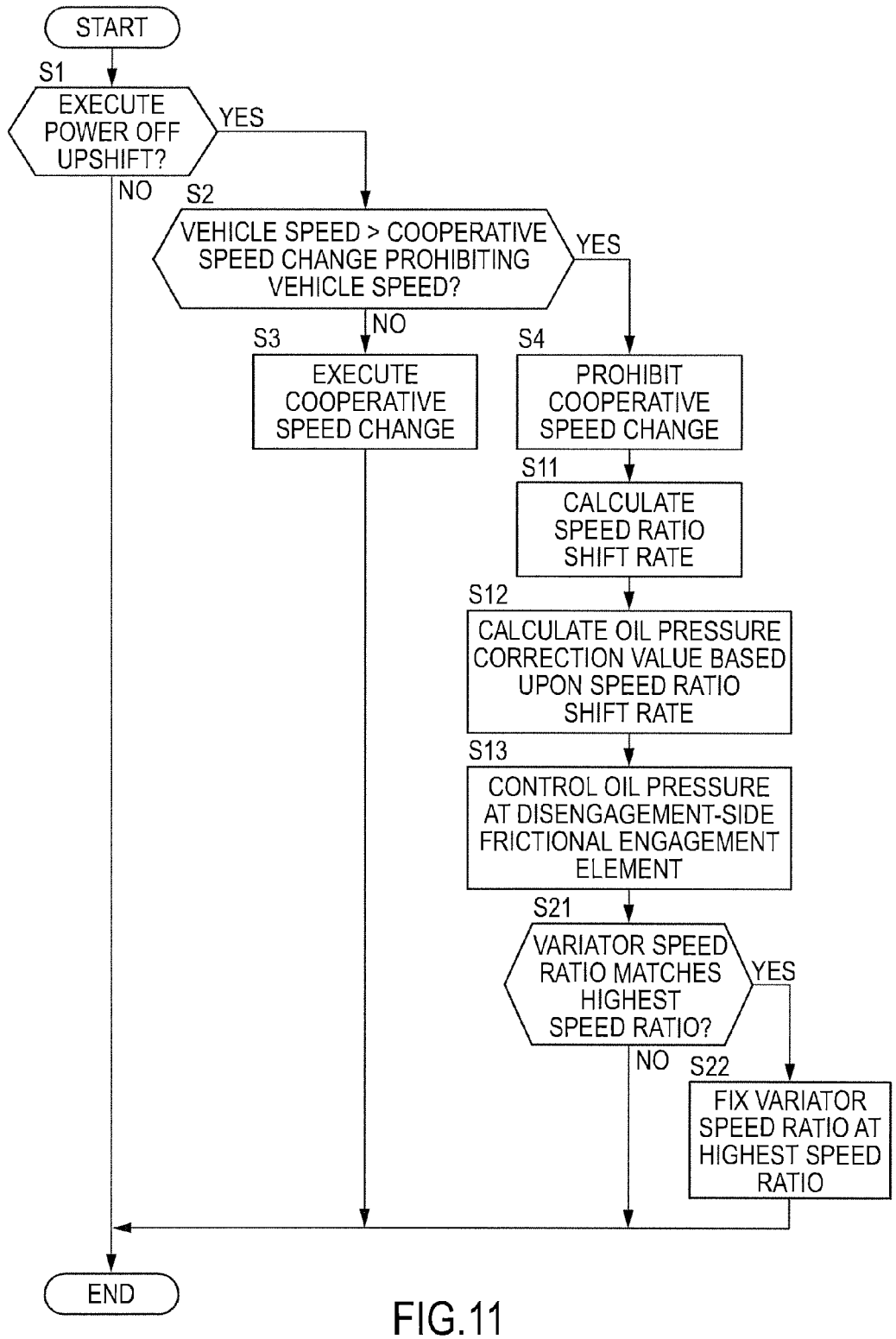
FIG. 11 is a flowchart of the processing executed based upon a transmission control program in a third embodiment of this invention.

FIG. 11 is an example of a shift control program that may be stored in the storage device 122 of the transmission controller 12 in the embodiment. The transmission controller 12 repeatedly executes this routine over a predetermined arithmetic operation cycle. The predetermined arithmetic operation cycle is set to 10 ms in the embodiment. In reference to FIG. 11, the shift control executed by the transmission controller 12 is described in specific detail.

In a step S21, the transmission controller 12 determines whether or not the actual speed ratio vRatio at the variator 20 is equal to the Highest speed ratio. If the actual speed ratio vRatio at the variator 20 is equal to the Highest speed ratio, the transmission controller 12 proceeds to execute the processing in a step S22, but the transmission controller 12 continues to execute control so as to adjust the actual speed ratio vRatio at the variator 20 to the target speed ratio vRatio0 otherwise.

In the step S22, the transmission controller 12 fixes the actual speed ratio vRatio at the variator 20 to the Highest speed ratio.

FIGS. 12A-12E present a time chart of the shift control operation executed in an embodiment.

After a high vehicle speed power OFF upshift starts at a time point t21, the operation enters the inertia phase at a time point t22. During the inertia phase, the input shaft rotation speed at the subtransmission mechanism 30 is shifted from the rotation speed corresponding to the first speed to the rotation speed corresponding to the second speed as the engine rotation speed is allowed to drop naturally without executing slip control. In addition, during the first half of the inertia phase, control is executed so as to keep the oil pressure at the engagement-side frictional engagement element at the engagement initial pressure.

Once the input shaft rotation speed at the subtransmission mechanism 30 falls and the speed ratio shift rate exceeds a predetermined value at a time point t23, the oil pressure at the engagement-side frictional engagement element is increased from the engagement initial pressure.

While the target speed ratio vRatio0 at the variator 20 shifts from the Highest speed ratio toward the larger speed ratio side at a time point t24, the actual speed ratio vRatio at the variator 20 is sustained at the Highest speed ratio in the embodiment.

Since this ensures that the actual speed ratio vRatio at the variator 20 does not shift from the Highest speed ratio further toward the larger speed ratio side, the driver will not experience an acute sense of deceleration during the shift. Furthermore, since the rate at which the input shaft rotation speed falls at the subtransmission mechanism 30 does not increase, the extent of shock occurring as the inertia phase ends and the torque capacity on the engagement-side increases can be minimized.

It will be obvious that this invention is not limited to the embodiments described in specific detail above and it will be understood by those skilled in the art that various changes in form and detail may be made therein without departing from the spirit, scope and teaching of the invention.

For instance, if the vehicle speed is lower than the cooperative speed change prohibiting vehicle speed, a cooperative speed change is executed during the inertia phase in the embodiments. However, provided that a possible occurrence of an undershoot is not an issue or that heat generation at the friction side frictional engagement element needs to be avoided even at the cost of allowing an undershoot, a cooperative speed change may be prohibited even when the vehicle speed is less than the cooperative speed change prohibiting vehicle speed.

In addition, while the vehicle speed assumed at the point at which the coasting line and the high speed mode Highest line intersect each other is designated as the cooperative speed change prohibiting vehicle speed, the vehicle speed assumed at the point at which heat generation at the friction side* frictional engagement element becomes an issue may be designated as the cooperative speed change prohibiting vehicle speed, instead.

Furthermore, while the subtransmission mechanism 30 in the embodiments assumes two forward gear positions, i.e., the first speed and the second speed, a gear mechanism with three or more forward gear positions may be utilized as the subtransmission mechanism 30, instead.

Moreover, while the subtransmission mechanism 30 in the embodiments is constituted with a Ravigneaux planetary gear mechanism, this invention may be adopted in conjunction with a subtransmission mechanism assuming another structure. For instance, the subtransmission mechanism 30 may include a standard planetary gear mechanism operating in conjunction with the frictional engagement elements or it may include a plurality of motive power transmission paths constituted with a plurality of gear trains assuming varying gear ratios and a frictional engagement element used to switch from one motive power transmission path to another.

Also, while the hydraulic cylinders 23a and 23b function as actuators that respectively displace the movable conical plates of the pulleys 21 and 22 along the axial direction, electrically driven actuators, instead of hydraulic actuators, may be used.

While the mode switch speed ratio is set to a value equal to that of the low speed mode Highest speed ratio, the word "equal" used in this context may mean "substantially equal" without departing from the technical scope of this invention.

In addition, while an explanation is given above on an example in which the continuously variable transmission mechanism is constituted with a belt-type continuously variable transmission mechanism that includes a belt and pulleys, this invention is not limited to such an example. For instance, this invention may be adopted in conjunction with a chain-type continuously variable transmission mechanism that includes a chain and pulleys or in conjunction with a toroidal continuously variable transmission mechanism that includes a power roller and input/output disks.

The invention claimed is:

1. A control device for a vehicle continuously variable transmission, the vehicle continuously variable transmission being equipped with:
   a continuously variable transmission mechanism that allows a speed ratio to be continuously adjusted; and
   a subtransmission mechanism that is disposed in series with the continuously variable transmission mechanism, assumes a first gear position and a second gear position with a smaller speed ratio relative to a speed ratio corresponding to the first gear position as forward gear positions thereof, and switches from the first gear position to the second gear position or vice versa by selectively engaging or disengaging a plurality of frictional engagement elements, comprising:

a transmission controller programmed so that:

a cooperative speed change is executed when the gear position at the subtransmission mechanism is changed, the cooperative speed change comprising changing the speed ratio at the subtransmission mechanism and controlling a rate at which the speed ratio of the subtransmission mechanism changes while changing the speed ratio of the continuously variable transmission mechanism along a direction opposite from another direction in which the speed ratio at the subtransmission mechanism changes to keep pace with the change in the speed ratio at the subtransmission mechanism; and in an inertia phase occurring during switching the gear position at the subtransmission mechanism from the first gear position to the second gear position when a negative torque is input to the vehicle continuously variable transmission, the cooperative speed change is prohibited and a torque capacity at a disengagement-side frictional engagement element in the subtransmission mechanism is controlled so as to sustain a value substantially equal to zero without controlling the rate of change of the speed ratio at the subtransmission mechanism.

2. The control device for the vehicle continuously variable transmission as defined in claim 1, wherein:

the transmission controller is further programmed so that:

at a vehicle speed equal to or higher than a predetermined vehicle speed at which a quantity of heat generated at the disengagement-side frictional engagement element when the torque capacity at the disengagement-side frictional engagement element is adjusted to a torque transmission-enabled capacity becomes an issue, control is executed so as to adjust the torque capacity at the disengagement-side frictional engagement element in the subtransmission mechanism to substantially 0.

3. The control device for the vehicle continuously variable transmission as defined in claim 2, wherein:

the transmission controller is further programmed so that:

when the vehicle speed is lower than the predetermined vehicle speed, a rate at which an input shaft rotation speed at the subtransmission mechanism changes is adjusted by controlling the torque capacity at the disengagement-side frictional engagement element at the torque transmission-enabled capacity and the speed ratio at the continuously variable transmission mechanism is adjusted toward a larger speed ratio side in correspondence to the rate of change during the inertia phase.

4. The control device for the vehicle continuously variable transmission as defined in claim 2, wherein:

the predetermined vehicle speed is a vehicle speed assumed at a point at which a high speed mode Highest line, obtained by minimizing the speed ratio at the continuously variable transmission mechanism and setting the gear position at the subtransmission mechanism to a highest gear position, and a coasting line indicating an overall speed ratio for a coasting operation intersect each other on a shift map.

5. The control device for the vehicle continuously variable transmission as defined in claim 1, wherein:

the transmission controller is further programmed so that:

a speed ratio shift rate at which the speed ratio shifts at the subtransmission mechanism during the inertia phase is calculated and the torque capacity at an engagement-side frictional engagement element is corrected to a greater value based upon the speed ratio shift rate at the subtransmission mechanism.

6. The control device for the vehicle continuously variable transmission as defined in claim 1, wherein:

the transmission controller is further programmed so that:

if the speed ratio at the continuously variable transmission mechanism reaches a Highest speed ratio during the inertia phase, the speed ratio at the continuously variable transmission mechanism is fixed at the Highest speed ratio.

7. A control device for a vehicle continuously variable transmission, the vehicle continuously variable transmission being equipped with:

a continuously variable transmission mechanism that allows a speed ratio to be continuously adjusted; and a subtransmission mechanism that is disposed in series with the continuously variable transmission mechanism, assumes a first gear position and a second gear position with a smaller speed ratio relative to the speed ratio corresponding to the first gear position as forward gear positions thereof, and switches from the first gear position to the second gear position or vice versa by selectively engaging or disengaging a plurality of frictional engagement elements, comprising:

a shift control means for executing a cooperative speed change when the gear position of the subtransmission mechanism is changed, the cooperative speed change comprising changing the speed ratio of the subtransmission mechanism and controlling a rate at which the speed ratio at the subtransmission mechanism changes while changing the speed ratio at the continuously variable transmission mechanism along a direction opposite from another direction in which the speed ratio at the subtransmission mechanism changes to keep pace with the change in the speed ratio at the subtransmission mechanism; and a torque capacity control means for prohibiting the cooperative speed change and controlling a torque capacity at a disengagement-side frictional engagement element in the subtransmission mechanism so as to sustain a torque capacity value substantially equal to zero without controlling the rate of change of the speed ratio of the subtransmission mechanism in an inertia phase occurring during adjusting the gear position at the subtransmission mechanism from the first gear position to the second gear position when a negative torque is input to the vehicle continuously variable transmission.

8. A method for controlling a vehicle continuously variable transmission equipped with:

a continuously variable transmission mechanism that allows a speed ratio to be continuously adjusted; and a subtransmission mechanism that is disposed in series with respect to the continuously variable transmission mechanism, assumes a first gear position and a second gear position with a smaller speed ratio relative to the speed ratio corresponding to the first gear position as forward gear positions thereof, and switches from the first gear position to the second gear position or vice versa by selectively engaging or disengaging a plurality of frictional engagement elements, the method comprising:

setting an overall speed ratio to be achieved via both the continuously variable transmission mechanism and the subtransmission mechanism based upon a vehicle operating state as a final speed ratio;

executing a cooperative speed change when the gearosition of the subtransmission mechanism is changed, the cooperative speed change comprising changing the speed ratio of the subtransmission mechanism and controlling a rate at which the speed ratio at the subtransmission mechanism changes while changing the speed ratio at the continuously variable transmission mechanism along a direction opposite from another direction in which the speed ratio at the subtransmission mechanism changes to keep pace with the change in the speed ratio at the subtransmission mechanism; and prohibiting the cooperative speed change and controlling a torque capacity at a disengagement-side frictional engagement element in the subtransmission mechanism so as to sustain a torque capacity value substantially equal to zero without controlling the rate of change of the speed ratio of the subtransmission mechanism in an inertia phase occurring during a process of adjusting the gear position at the subtransmission mechanism from the first gear position to the second gear position when a negative torque is input to the vehicle continuously variable transmission.

9. The method for controlling the vehicle continuously variable transmission as defined in claim 8, further comprising:

obtaining a high speed mode Highest line by minimizing the speed ratio at the continuously variable transmission mechanism and setting the gear position at the subtransmission mechanism to a highest gear position, and obtaining a coasting line indicating an overall speed ratio for a coasting operation.

* * * * *